Jan. 29, 1957 H. B. BROOKS 2,779,143

METHOD OF CLOSING A HEAT EXCHANGER

Filed March 28, 1952

INVENTOR
HERBERT B. BROOKS

BY Hyman Hurwitz
ATTORNEY

United States Patent Office 2,779,143

Patented Jan. 29, 1957

2,779,143

METHOD OF CLOSING A HEAT EXCHANGER

Herbert B. Brooks, Prescott, Ariz.

Application March 28, 1952, Serial No. 279,197

1 Claim. (Cl. 53—25)

The present invention relates generally to automatic cooling systems, and more particularly to devices of simple and economical construction for transferring heat rapidly from a heat source to a heat sink, and to methods of fabricating such devices.

Briefly described, devices in accordance with the present invention utilize the evaporation of a volatilizable liquid to abstract heat from a heat source, and the condensation of that liquid to supply the heat to a heat sink, in accordance with principles well known per se. The liquid is contained, in accordance with the invention, in a tube, which may be fabricated of metal, such as copper, but which may also, if desired, be fabricated of non-metallic material. The tube may be, specifically, a length of copper tubing, partly filled with volatile liquid and end sealed by brazing. The tube may be installed with its lower end secured to a heat source and with its higher end secured to a heat sink. The volatile liquid boils because of the heat source at its lower end, and condenses in the cooler portion of the tube at its upper end, returning as a liquid to the lower end. The vapor carries heat of vaporization up with it from the heat source, giving up this heat to the heat sink, condensing on losing its heat, and then flowing back downward as a liquid, to complete a heat exchange cycle.

The thermal conductivity and heat exchange efficiency of the device is extremely high due to the fact that liquid in boiling takes up a very large quantity of heat per unit of volume of the liquid, which it gives up on condensing.

It has been found that devices constructed in accordance with the invention have a thermal conductivity which is substantially independent of the length of the device, and equal to the thermal conductivity of a solid bar of copper 1½ inches long. Hence a device, in accordance with the invention, and which is six inches long, possesses four times the thermal conductivity of a bar of copper of the same dimensions.

The device of the invention finds particular application to miniaturization of electronic apparatus, and to hermetic sealing of electrical, electronic or other components which generate heat.

Devices constructed in accordance with the principles of the present invention exhibit a temperature stabilizing action, their thermal conductivity in watts per degree centigrade of temperature difference between the ends dropping as the mean temperature of the device decreases below 50° C., and increasing as the temperature increases. The reason for this phenomenon is that a higher temperature difference is required at lower temperatures to maintain vapor pressure differences adequate to enable rapid circulation of the coolant.

It is, accordingly, a broad object of the invention to provide a simple, inexpensive, and small device for exchanging heat.

It is a more specific object of the invention to provide a simple, inexpensive heat exchanger comprising a hollow closed tube having therein a quantity of readily volatilizable liquid.

It is another object of the invention to provide effective methods of fabricating heat exchangers in accordance with the invention, and more particularly for end sealing the hollow tubes.

The above and still further features, objects and advantages of the invention will become apparent upon consideration of the following detailed description of specific embodiments thereof, especially when taken in conjunction with the accompanying drawings, wherein.

Figure 1:
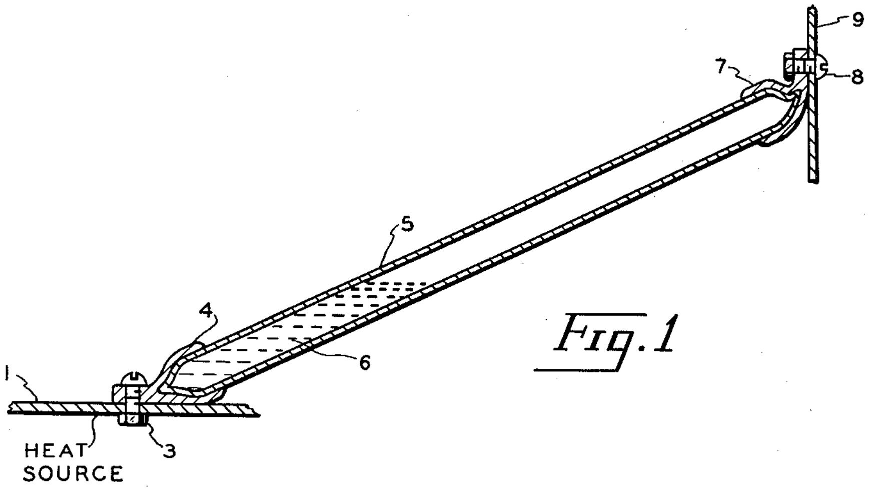
Figure 1 is a view in longitudinal section taken through a heat exchanger, in accordance with the invention, and its mountings.

In Figure 1 of the accompanying drawings, the reference numeral 1 denotes a heat source, which may be a chassis of an electronic device. To the chassis 1 is secured, by bolt 2 and nut 3, a mounting lug 4, fabricated preferably of metal, and serving as a clamp for a tube 5, and brazed to the latter. The tube 5 extends upwardly from the chassis 1, and contains a relatively small quantity of volatile liquid 6. The upper end of the tube 6 is then clamped by means of mounting lug 7, brazed thereto, and bolt and nut 8 secures the mounting lug 7 to cabinet wall 9.

Clearly, if desired, the mode of securing the tube 5 between the chassis 1 and the cabinet wall 9, may be varied, and if desired a soldered connection may be employed.

The liquid 6 may be, and preferably is, ethyl chloride. This liquid boils at low temperature, and has a high heat of vaporization. However, it is realized that other suitable liquids exist and may be employed.

In preparing the tube, a proper length of copper tubing is prepared, as by sawing, and one end is sealed in final form. The closed end of the tube is filled partially with ethyl chloride, while that end is immersed in an ice bath, to prevent boiling of the liquid (or in an alcohol-Dry Ice mixture). The upper end of the tube is then flattened, but not completely, so that a very small gap remains through which the brazing alloy can flow into the end to be sealed. The open end is sealed by brazing, and then drilled, if desired, so that it may be bolted as desired.

A satisfactory seal cannot be obtained while the ethyl chloride is boiling because the brazing alloy will not flow into the gap to be sealed against even slight internal pressure. It is also necessary that not more than a very small quantity of air be trapped in the tube, because the air will impede the circulation of the working fluid and thus reduce the conductivity of the device. This is so because the air cannot accompany the working fluid in the latter's changes of state from liquid to gas, and reverse, but must separate by diffusion from the working fluid upon the latter's condensation. The effect of impurities dissolved in the fluid is analogous.

Therefore, the procedure I follow is to allow the ethyl chloride to boil rapidly for a few seconds while heat is applied to the upper end of the tube preparatory to brazing. This can be accomplished while maintaining the lower end of the tube in an ice bath, by neglecting to stir the ice bath. After the upper or open end of the tube is sufficiently heated, brazing compound is applied, and then the ice bath stirred. Stirring of the ice bath reduces the temperature of the ethyl chloride sufficiently to reduce or stop boiling, and since the only vapor or gas in the tube is the vapor of ethyl chloride, any air having been driven out by the ethyl chloride vapor, some of this vapor condenses, forming a slight vacuum in the tube. Atmospheric pressure then forces some of the brazing compound into the gap to be sealed, the heat is removed, and the compound hardens, completing the seal.

There are problems to be solved in maintaining a good heat conducting connection between the heat exchanger of the invention and the heat source and sink. These problems are particularly acute in the larger sizes of heat exchanger, say of ½" outer diameter.

Figure 2:
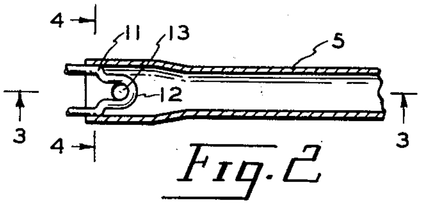
Figure 2 is a partial view in cross-section taken through an end seal of a tubular heat exchanger.
Figure 3:
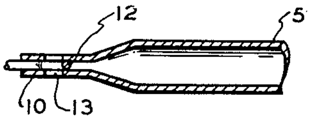
Figure 3 is a partial view in cross-section, taken at right angles to the view of Figure 2.
Figure 4:
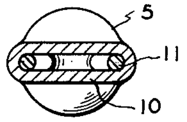
Figure 4 is an end view of an end seal of a tubular heat exchanger.

A satisfactory end closure is illustrated in Figures 2, 3 and 4 of the accompanying drawings.

The reference numeral 5 represents an end portion of a metallic tube, fabricated of copper, for example. The end of the tube is flattened, as at 10, without closing same, and into the flattened end is inserted a pre-formed member 11, having generally a U-shape, and in the base of the U a further smaller U-shape 12, extending inwardly of the tube end 5. The member 11 may be formed of copper wire, by bending, or may be stamped, and has dimensions such as to substantially close the end of tube 5.

The pre-formed member 11 is then brazed to the inside walls of the tube 5, by the method hereinbefore explained in detail, to complete the seal. An aperture 13 is then drilled, inside the smaller U-shape 12, so that no brazing metal need be disturbed or removed by the drilling operation. The aperture 13 then serves for mounting the end of the tube 5. Clearly each end of the tube 5 may be similarly fabricated.

It has been found that wire cuttings, filings, broken glass or the like, may be sealed into the tube with the coolant, to facilitate boiling.

While I have described and illustrated specific examples of the invention, slight modifications of structural arrangement may be resorted to without departing from the true spirit and scope of the invention as defined in the appended claim.

What I claim and desire to secure by Letters Patent of the United States is:

The method of closing an open end of a tube containing a highly volatile liquid, and having one end closed, comprising the steps of (1) maintaining said liquid in the closed end of said tube at a temperature near or above the boiling temperature of said liquid, for a period of time prior to sealing, (2) applying sealing material to said open end while said liquid is boiling, and (3) thereafter reducing the temperature of said liquid to form a partial vacuum, and by reason of said vacuum to force a portion of said sealing material internally of said tube and reducing the temperature of said sealing material to a temperature at which it hardens.

References Cited in the file of this patent

UNITED STATES PATENTS

| | | |
|---|---|---|
| 1,165,840 | Brutus | Dec. 28, 1915 |
| 1,325,799 | Ornstein | Dec. 23, 1919 |
| 1,748,518 | Midgely | Feb. 25, 1930 |
| 1,769,112 | Davenport | July 1, 1930 |
| 1,817,394 | Pais | Aug. 4, 1931 |
| 1,909,708 | Neuwirth | May 16, 1933 |
| 1,930,085 | Fehse | Oct. 10, 1933 |
| 2,160,617 | Kellner | May 30, 1939 |
| 2,304,521 | Wuestman | Dec. 8, 1942 |
| 2,659,215 | Massopust | Nov. 17, 1953 |

FOREIGN PATENTS

| | | |
|---|---|---|
| 22,272 | Great Britain | Dec. 5, 1892 |